US008050146B2

(12) United States Patent
Jeon et al.

(10) Patent No.: US 8,050,146 B2
(45) Date of Patent: Nov. 1, 2011

(54) METHOD AND SYSTEM FOR PROVIDING GREENWICH MEAN TIME IN MOBILE BROADCASTING SERVICE

(75) Inventors: Jin-Woo Jeon, Seongnam-si (KR);
Young-Jip Kim, Suwon-si (KR);
Jae-Yeon Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 640 days.

(21) Appl. No.: 12/212,357

(22) Filed: Sep. 17, 2008

(65) Prior Publication Data

US 2009/0077591 A1 Mar. 19, 2009

(30) Foreign Application Priority Data

Sep. 17, 2007 (KR) .............................. 2007-0094436

(51) Int. Cl.
*G04B 47/00* (2006.01)
*H04M 1/00* (2006.01)
*G06F 13/00* (2006.01)

(52) U.S. Cl. ......... 368/10; 455/556.1; 709/219; 725/40; 725/51

(58) Field of Classification Search .................... 368/10, 368/13, 46, 47; 455/414.3, 502, 556.1, 566; 709/217–219; 725/40, 51
See application file for complete search history.

(56) References Cited

U.S. PATENT DOCUMENTS

| | | | | |
|---|---|---|---|---|
| 7,344,079 | B2* | 3/2008 | Steusloff et al. | 235/462.08 |
| 7,394,802 | B2* | 7/2008 | Jun et al. | 370/350 |
| 7,948,833 | B2* | 5/2011 | Ha et al. | 368/47 |
| 2002/0142783 | A1* | 10/2002 | Yoldi et al. | 455/456 |
| 2004/0028162 | A1* | 2/2004 | Skahan et al. | 375/356 |
| 2004/0224707 | A1* | 11/2004 | Jou | 455/466 |
| 2005/0013200 | A1 | 1/2005 | Choi | |
| 2005/0185514 | A1* | 8/2005 | Ihara et al. | 368/47 |
| 2006/0233132 | A1* | 10/2006 | Lee | 370/328 |
| 2007/0133501 | A1* | 6/2007 | Park | 370/350 |
| 2009/0055875 | A1* | 2/2009 | Lee et al. | 725/62 |

FOREIGN PATENT DOCUMENTS

| | | |
|---|---|---|
| JP | 11-243583 | 9/1999 |
| KR | 1999-0029329 | 7/1999 |
| KR | 1020020080176 | 10/2002 |

* cited by examiner

*Primary Examiner* — Vit Miska
(74) *Attorney, Agent, or Firm* — The Farrell Law Firm, P.C.

(57) ABSTRACT

An apparatus and method for providing mobile broadcasting services through a communication network and a broadcast network, wherein a mobile terminal receives and stores Greenwich Mean Time (GMT) access address through an Electronic Service Guide (ESG) bootstrap File deLivery over Unidirectional Transport (FLUTE) session. The GMT access address is included in the ESG bootstrap FLUTE session when transmitted. The mobile terminal requests the GMT from the communication network using the GMT access address, receives the GMT from the communication network, and stores and sets the GMT.

22 Claims, 3 Drawing Sheets

METHOD AND SYSTEM FOR PROVIDING GREENWICH MEAN TIME IN MOBILE BROADCASTING SERVICE

PRIORITY

This application claims priority under 35 U.S.C. §119(a) to an application entitled "METHOD AND SYSTEM FOR PROVIDING GREENWICH MEAN TIME IN MOBILE BROADCASTING SERVICE" filed in the Korean Industrial Property Office on Sep. 17, 2007 and assigned Serial No. 2007-94436, the contents of which are incorporated herein by reference.

BACKGROUND OF THE INVENTION

1. Field of the Invention

The present invention relates generally to a method and system for providing Greenwich Mean Time (GMT) in a mobile broadcasting service based on Digital Video Broadcast-Handheld Convergence of Broadcast and Mobile Services (DVB-H CBMS), and more particularly to a method and system for providing GMT to a mobile terminal through a communication network.

2. Description of the Related Art

There are continuous requests for the mobile communication market to create new services through recombination or integration of existing technologies. Today, with the development of communication and broadcasting technologies, either a conventional broadcast system or a mobile communication system reaches a phase of providing mobile broadcasting service through a portable terminal (or a mobile terminal) such as a mobile phone or a Personal Digital Assistant (PDA). While engaging with sharply increasing demands of users in conjunction with this potential, practical market demand for multimedia services, strategies of service providers who intend to provide new service in addition to an existing voice service, and interests of Information Technology (IT) companies that reinforce mobile communication businesses to meet the demands of users, convergence of the mobile communication service and the Internet Protocol (IP) has been settled as a main current of next generation mobile communication technology. Further, commercialization and standardization of the mobile broadcasting service that provides broadcasting services to mobile terminals are actively under way.

For example, commercial services based on the DVB-H CBMS standard have already been provided in Italy, and commercial services based on the Open Air Interface (OAI) standard led by Nokia are being provided in Vietnam. In addition to these standards, there are various standards associated with the mobile broadcasting service, such as the S/T Digital Multimedia Broadcasting (S/T DMB) standard, the MediaFlo standard, the DVB-Satellite services to Handheld (DVB-SH) standard, the Open Mobile Alliance Mobile BroadCAST (OMA-BCAST) standard, etc. In particular, the DVB-H CBMS, DVB-SH, Nokia-OAI, and OMA-BCAST standards have considerable common characteristics in that they make use of a DVB-H network for a subordinate transmission end, and that they are required to receive Electronic Service Guide (ESG) data in order to provide the mobile broadcasting service. However, these standards show a difference between data models used in the ESG data between elements and attributes used in each fragment.

The providers who intend to provide the mobile broadcasting service using the DVB-H network have one of the providers' common requirements, which is to provide the ESG data using the broadcasting network and the communication network at the same time. Particularly, the OMA-BCAST standard provides a method of receiving the ESG data, as well as a method of providing the ESG data in various fields in combination of the broadcasting network aid the communication network. Thus, the ESG data should include broadcasting content provided through the broadcasting network, as well as guide information about broadcasting content provided through the communication network. In conjunction with transmission of the ESG data, standardization is under way.

In general, ESG data is divided into a plurality of fragments when transmitted to a mobile terminal in the mobile broadcasting service, and can be transmitted through two processes. An announcement session shows how the fragments are divided and over which network the fragments are transmitted, and transmits Internet Protocol (IP) address information or Uniform Resource Locator (URL) information that is required to receive the fragments. Thus, the information, which is required to receive the ESG data, is obtained through the announcement session. On the basis of the obtained information, an ESG data session receives ESG fragments. The DVB-H or DVB-SH standard defines an ESG bootstrap session, in addition to the two aforementioned sessions. This ESG bootstrap session provides a method of selecting a specific ESG data provider in the case in which the ESG data provider is plural in number, and provides an ESG access descriptor.

Meanwhile, in order to enable the mobile terminals to execute the mobile broadcasting service, the mobile terminals must provide time synchronization to the broadcast network and the communication network, which provide the mobile broadcasting service. Thus, the mobile terminals receive Program Specific Information (PSI) or Service Information (SI) information through broadcast stream transmitted over the broadcast network, and then receive Greenwich Mean Time (GMT) using a Time and Data Table (TDT) of the received PSI or SI information.

However, the conventional mobile broadcasting service does not provide GMT through the communication network, and thus the mobile terminals cannot obtain GMT through the communication network. For this reason, in cases in which the mobile broadcasting service is conducted through the communication network while no broadcast signal is received, the time synchronization must be provided between the mobile terminal and the broadcasting service system.

SUMMARY OF THE INVENTION

The present invention has been designed to solve at least the above-mentioned problems occurring in the prior art, and provides a method and system for providing Greenwich Mean Time (GMT) through a communication network.

In accordance with an aspect of the present invention, there is provided a method for providing Greenwich Mean Time (GMT) in a mobile broadcasting service providing broadcasting services through a communication network and a broadcast network, the method including, transmitting, by a mobile terminal, an Electronic Service Guide (ESG) query to a pre-stored GMT access address when requiring the GMT, thereby requesting the GMT to the communication network; and receiving the GMT from the communication network, and storing and setting the GMT.

In accordance with another aspect of the present invention, there is provided a system for providing Greenwich Mean Time (GMT) in a mobile broadcasting service providing broadcasting services through a communication network and a broadcast network, the system including a broadcast-providing server, which transmits a GMT access address included in an Electronic Service Guide (ESG) bootstrap File deLivery over Unidirectional Transport (FLUTE) session; and a mobile terminal, which receives and stores the GMT access address through the ESG bootstrap FLUTE session, requests the GMT from the communication network using the GMT access address when requiring the GMT, receives the GMT from the communication network, and stores and sets the GMT.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE EXEMPLARY EMBODIMENT

Figure 1:
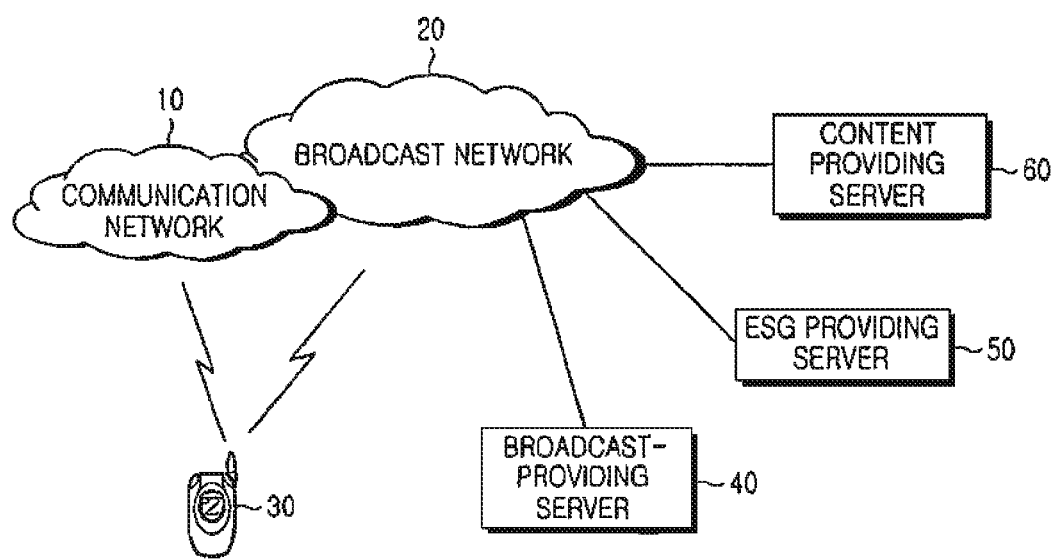
FIG. 1 illustrates the configuration of a mobile broadcast system to which the present invention is applied.

Hereinafter, exemplary embodiments of the present invention will be described with reference to the accompanying drawings. In the following description, the same elements will be designated by the same reference numerals although they are shown in different drawings. Further, various specific definitions found in the following description, such as specific values of packet identifications, contents of displayed information, etc., are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

FIG. 1 illustrates a configuration of a mobile broadcast system to which the present invention is applied. Referring to FIG. 1, the mobile broadcast system includes a communication network 10, a broadcast network 20, a mobile terminal 30, a broadcast-providing server 40, an Electronic Service Guide (ESG) data-providing server 50, and a content-providing server 60.

The communication network 10 provides broadcasting services according to wired communication services, mobile communication services, and mobile broadcasting services. The broadcast network 20 provides broadcasting services according to mobile broadcasting services.

The mobile terminal 30 includes a portable terminal, such as a mobile phone, a Personal Digital Assistant (PDA), etc., receives and conducts the mobile broadcasting service from the communication network 10 and the broadcast network 20, and provides the conducted mobile broadcasting service to a user. The mobile terminal 30 performs mobile communication services. The content-providing server 60 provides various pieces of broadcasting content, such as television programs, games, advertisements, etc., through the mobile broadcasting service. The ESG data-providing server 50 creates ESG data associated with the content provided by the content-providing server 60. The broadcast-providing server 40 provides the broadcasting content and the ESG data, which are provided by the content-providing server 60 and the ESG data-providing server 50, to the mobile terminal 10 through the communication network 10 and the broadcast network 20 according to a mobile broadcasting service standard.

The broadcast-providing server 40 provides Greenwich Mean Time (GMT) to the mobile terminal 30 through the communication network 20 along with address information, namely, a GMT access address that is capable of accessing an ESG bootstrap FLUTE session.

Figure 2:
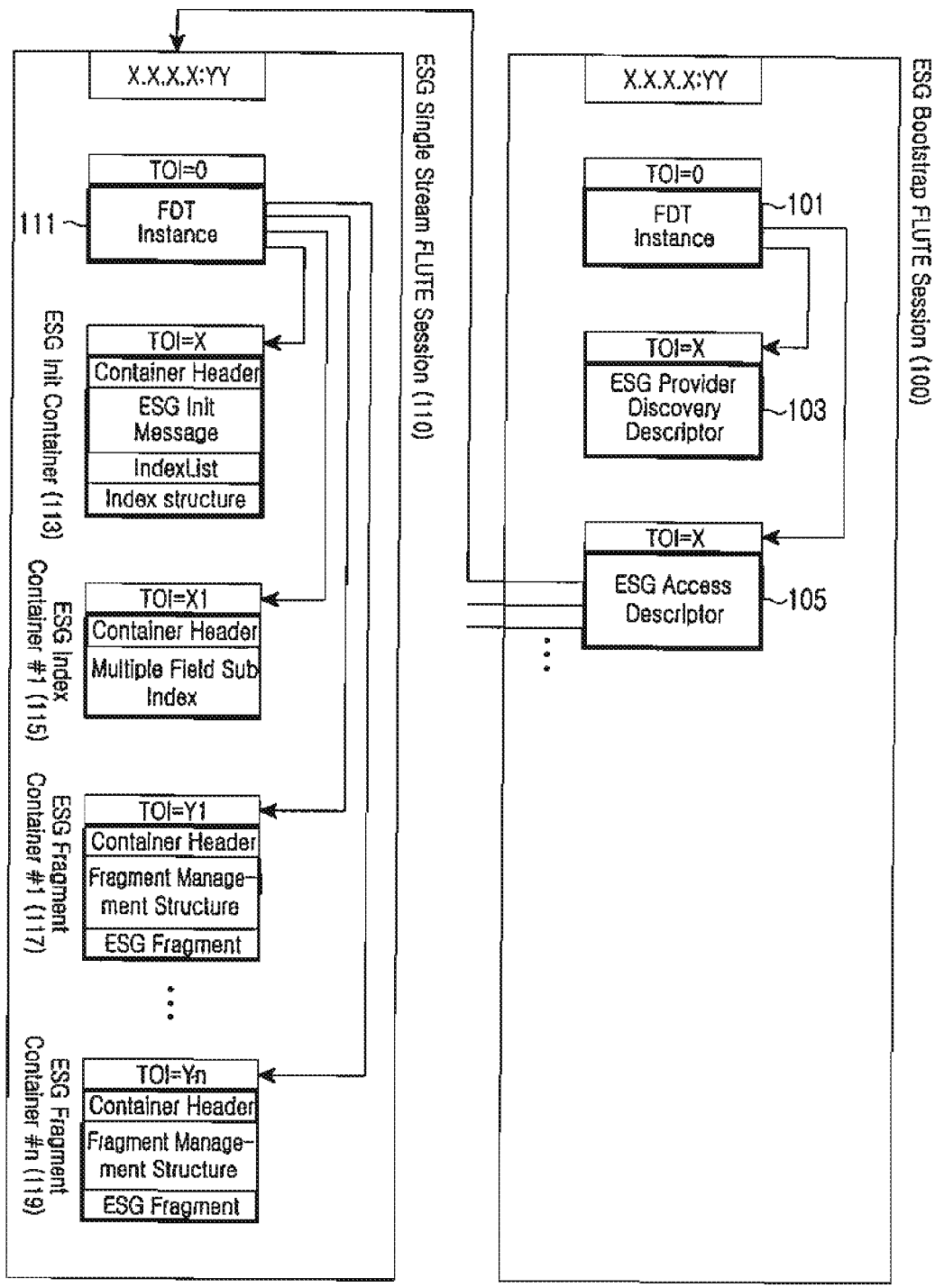
FIG. 2 illustrates the structure of an Electronic Service Guide (ESG) bootstrap File delivery over Unidirectional Transport (FLUTE) session according to an embodiment of the present invention.

An ESG bootstrap FLUTE session 100 according to an embodiment of the present invention is illustrated in FIG. 2. Referring to FIG. 2, the ERG bootstrap FLUTE session 100 includes a Formal Description Technique (FDT) instance 101, an ESG provider discovery descriptor 103, and an ESG access descriptor 105. The ESG provider discovery descriptor 103 includes an ESG data provider list, i.e., a list of the ESG data-providing servers 50. The ESG access descriptor 105 includes access information about the ESG data for each ESG data provider. In FIG. 2 illustrates a case where there is one ESG provider, as an example. Thus, an FDT instance 111 an ESG Init. container 113, an ESG index container 115, and n ESG fragment containers 117 and 119 constitute an ESG single stream FLUTE session 110. According to an embodiment of the present invention, the GMT access address can be included in the ESG access descriptor 105 of the ESG bootstrap FLUTE session 100.

Thus, the ESG access descriptor 105 of the ESG bootstrap FLUTE session 100 includes ESG entry syntax, broadcast descriptor syntax, complementary interactive descriptor syntax, complete interactive descriptor syntax, and repair interactive descriptor syntax, which are formed as in Tables 1 through 5 below, in order to provide the mobile broadcasting service through the communication network 10 and the broadcast network 20, and further includes a time interactive descriptor syntax, which is formed as in Table 6, in order to provide the GMT access address, according to the present invention.

Table 1 shows the ESG entry syntax.

TABLE 1

| Syntax | No. of bits | Mnemonic | Notes |
|---|---|---|---|
| ESGEntry{ | | | |
| ESGEntryVersion | 8 | Uimsbf | 2 |
| ESGEntryLength | 8+ | vluimsbf8 | |
| ProviderID | 16 | uimsbf | |
| n_o_AccessPoints | 8 | uimsbf | |
| for (i=0; i< n_o_AccessPoints; i++){ | | | |
| AccessType | 8 | uimsbf | 1 for BC 2 for IA |
| AccessPointLength | 8+ | vluimsbf8 | ????? |
| If (AccessType=0x01){ | | | |
| MultipleStreamTransport | 1 | bslbf | |
| IPVersion6 | 1 | bslbf | |
| Reserved | 6 | bslbf | |
| if(IPVersion6){ | | | |
| SourceIPAddress | 128 | bslbf | |
| DestinationIPAddress | 128 | bslbf | |
| }else{ | | | |
| SourceIPAddress | 32 | bslbf | |
| DestinationIPAddress | 32 | bslbf | |
| } | | | |
| Port | 16 | uimsbf | |
| TSI | 16 | uimsbf | |

TABLE 1-continued

| Syntax | No. of bits | Mnemonic | Notes |
|---|---|---|---|
| } | | | |
| Else if (AccessType=0x02){ | | | |
| CompleteESGoIA | 1 | bslbf | |
| RepairESGoIA | 1 | bslbf | |
| ComplementingESGoIA | 1 | bslbf | |
| Reserved | 5 | bslbf | |
| URL_Length | 8+ | vluimsbf8 | |
| For (j=0; j<URL_Length;j++){ | | | |
| URLByte | 8 | bslbf | e.g., http://bbc.co.uk/ESG1 Anything else goes here |
| } | | | |
| } | | | |
| } | | | |
| } | | | |

Table 2 shows the broadcast descriptor syntax.

TABLE 2

| Syntax | No. of bits | Mnemonic | Notes |
|---|---|---|---|
| Broadcast Descriptor{ | | | |
| descriptor_tag | 8 | uimsbf | |
| descriptor_length | 8+ | vluimsbf8 | |
| MultiStreamTransport | 1 | bslbf | |
| IPVersion6 | 1 | bslbf | |
| Complementary | 2 | bslbf | '00' = this is a main stream '01' = this stream contains Required Complementary Parts '10' = this stream contains Optional Complementary parts 11 = reserved |
| Reserved | 4 | bslbf | |
| if(IPVersion6 == '1') { | | | |
| SourceIPAddress | 128 | bslbf | |
| destinationIPAddress | 128 | bslbf | |
| } else { | | | |
| SourceIPAddress | 32 | bslbf | |
| DestinationIPAddress | 32 | bslbf | |
| } | | | |
| Port | 16 | uimsbf | |
| TSI | 16 | uimsbf | |
| } | | | |

Table 3 shows the complementary interactive descriptor syntax.

TABLE 3

| Syntax | No. of bits | Mnemonic | Notes |
|---|---|---|---|
| Complementary Interactive Descriptor{ | | | |
| descriptor_tag | 8 | uimsbf | |
| descriptor_length | 8+ | vluimsbf8 | |
| Required | 1 | bslbf | '0' = optional '1' = Mandatory |
| Reserved | 7 | bslbf | |
| for(i=0; i<URILength; i++) { | | | |
| URIByte | 8 | bslbf | |
| } | | | |
| } | | | |

Table 4 shows the complete interactive descriptor syntax.

TABLE 4

| Syntax | No. of bits | Mnemonic | Notes |
|---|---|---|---|
| Complete Interactive Descriptor{ | | | |
| descriptor_tag | 8 | uimsbf | |
| descriptor_length | 8+ | vluimsbf8 | |
| for(i=0; i<URILength; i++) { | | | |
| URIByte | 8 | bslbf | |
| } | | | |
| } | | | |

Table 5 shows the repair interactive descriptor syntax.

TABLE 5

| Syntax | No. of bits | Mnemonic | Notes |
|---|---|---|---|
| Repair Interactive Descriptor{ | | | |
| descriptor_tag | 8 | uimsbf | |
| descriptor_length | 8+ | vluimsbf8 | |
| for(i=0; i<URILength; i++) { | | | |
| URIByte | 8 | bslbf | |
| } | | | |
| } | | | |

Table 6 shows the time interactive descriptor syntax.

TABLE 6

| Syntax | No. of bits | Mnemonic | Notes |
|---|---|---|---|
| Time Interactive Descriptor{ | | | |
| descriptor_tag | 8 | uimsbf | |
| descriptor_length | 8+ | vluimsbf8 | |
| required | 1 | bslbf | '0' = optional '1' = Mandatory |
| reserved | 7 | bslbf | |
| for(i=0; i<URILength; i++) { | | | |
| URIByte | 8 | bslbf | |
| } | | | |
| } | | | |

According to an embodiment of the present invention, the time interactive descriptor syntax is defined as in Table 6, the broadcast-providing server 40 includes an address, Hyper-Text Transport Protocol HTTP URL, to which the mobile terminal 30 can get access, in a Universal Resource Identifier Byte (URIByte) of the time interactive descriptor syntax, and then transmits the address.

Figure 3:
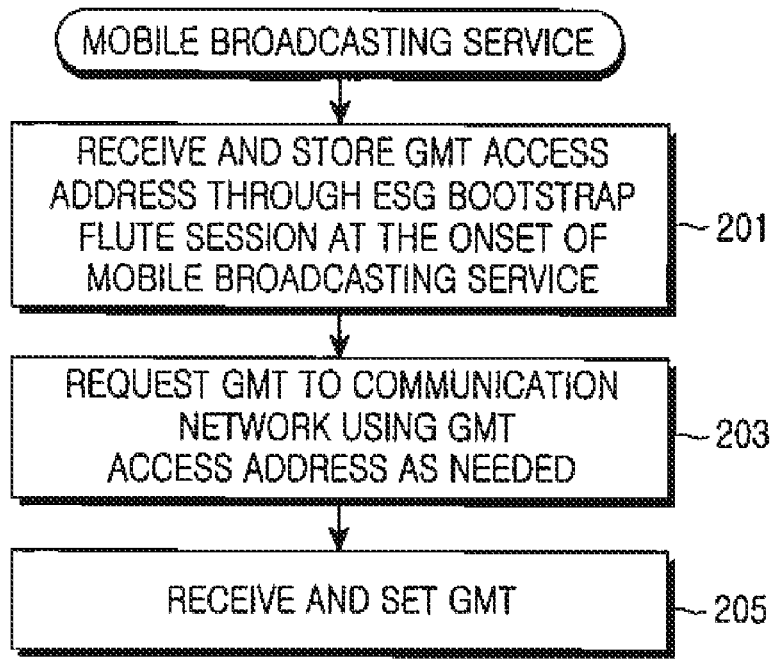
FIG. 3 illustrates the operation of a mobile terminal according to an embodiment of the present invention.

Thus, as illustrated in FIG. 3, the mobile terminal 30 receives and stores the GMT access address information through the ESG bootstrap FLUTE session on the onset of the mobile broadcasting service, in step S201. If necessary, the mobile terminal 30 obtains access to the communication network 10 using the stored GMT access address information, and then requests GMT, in step S203. For example, when the mobile terminal 30 cannot receive GMT through the broadcast network 20 due to an unstable transmission environment of the broadcast network 20, it can request GMT to the communication network 10. As another example, when the mobile broadcasting service is newly initiated, the mobile terminal 30 can request GMT to the broadcast network 20. Further, when GMT is needed while conducting the mobile broadcasting service, the mobile terminal 30 can request GMT to the broadcast network 20. The communication network 10 transmits GMT to the mobile terminal 30 at the request of the mobile terminal 30, and then the mobile terminal 30 receives and sets GMT, in step S205.

Meanwhile, according to another embodiment of the present invention, the mobile terminal 30 can request GMT to the communication network 10 as needed using a pre-stored GMT access address. At this time, the GMT access address is preset as a static address, and the request for GMT is made through an ESG query according to an embodiment of the present invention. The mobile terminal 30 transmits the ESG query to the communication network 10, when intending to receive a broadcasting service provided in the mobile broadcasting service through the communication network 10.

Figure 4:
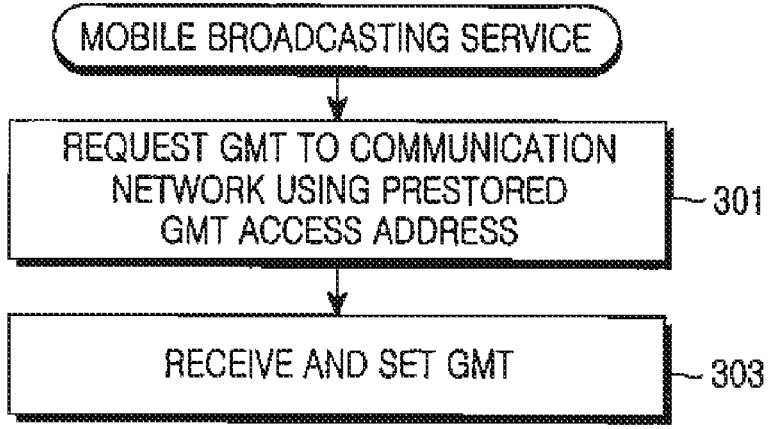
FIG. 4 illustrates the operation of a mobile terminal according to another embodiment of the present invention.

According to an embodiment of the present invention, the ESG query for the GMT request can be configured as follows. For the GMT request, a request-for-time item is added to the body of an existing HTTP/1.1 request message. At this time, a related type is defined as GMT. Thus, as illustrated in FIG. 4, the mobile terminal 30 activates the request-for-time item of the HTTP/1.1 request message body when GMT is needed while conducting the mobile broadcasting service, designates the type as GMT, and then requests GMT to the communication network 10 using a pre-stored GMT access address, in step S301. The mobile terminal 30 receives, stores and sets GMT having an eXtensible Markup Language (M) format from the communication network 10, in step S303.

As described above, the various embodiments of the present invention enable the mobile terminal to obtain GMT required for the mobile broadcasting service through the broadcast network and the communication networks and enable the mobile terminal to obtain GMT in the state in which the transmission environment of the broadcast network is unstable, thereby making it possible to provide the mobile broadcasting service through the communication network.

While the present invention has been shown and described with reference to certain exemplary embodiments thereof it will be understood by those skilled in the art that various changes in form and details may be made therein without departing from the spirit and scope of the invention as defined by the appended claims. For example, the mobile terminal 30 can receive and store the GMT access address through the ESG bootstrap FLUTE session, and then request and receive GMT to and from the communication network 10 using the stored GMT access address and the ESG query whenever needed. Thus, it is intended that the scope of the present invention be defined by the following claims and their equivalents, rather than by the aforementioned embodiments.

What is claimed is:

1. A method for providing Greenwich Mean Time (GMT) in a mobile broadcasting service providing broadcasting services through a communication network and a broadcast network, the method comprising:
   receiving and storing a GMT access address through an Electronic Service Guide (ESG) bootstrap File delivery over Unidirectional Transport (FLUTE) session, the GMT access address being included in the ESG bootstrap FLUTE session when transmitted;
   when requiring the GMT, requesting the GMT from the communication network using the GMT access address; and
   receiving the GMT from the communication network, and storing and setting the GMT.

2. The method according to claim 1, wherein the GMT access address is included in an ESG access descriptor of the ESG bootstrap FLUTE session.

3. The method according to claim 2, wherein the GMT access address is included in time interactive descriptor syntax of the ESG access descriptor formed according to the following table:

| Syntax | No. of bits | Mnemonic | Notes |
| --- | --- | --- | --- |
| Time Interactive Descriptor{ | | | |
| descriptor_tag | 8 | uimsbf | |
| descriptor_length | 8+ | vluimsbf8 | |
| required | 1 | bslbf | '0' = optional '1' = Mandatory |
| reserved | 7 | bslbf | |
| for(i=0; i<URILength; i++) | | | |
| { | | | |
| URIByte | 8 | bslbf | |
| } | | | |
| } | | | |

4. The method according to claim 2, wherein the mobile terminal requests the GMT through use of an ESG query.

5. The method according to claim 4, wherein the mobile terminal requests the GMT through use of at HTTP/1.1 request message.

6. The method according to claim 3, wherein the GMT is provided in an eXtensible Markup Language (XML) format.

7. The method according to claim 5, wherein the GMT is provided in an eXtensible Markup Language (XML) format.

8. A method for providing Greenwich Mean Time (GMT) in a mobile broadcasting service providing broadcasting services through a communication network and a broadcast network, the method comprising:
   transmitting, by a mobile terminal, an Electronic Service Guide (ESG) query to a pre-stored GMT access address, in order to request the GMT from the communication network;
   receiving, by the mobile terminal, the GMT from the communication network; and
   storing and setting the GMT.

9. The method according to claim 8, wherein the GMT access address is a static address.

10. The method according to claim 9, wherein the mobile terminal requests the GMT using a HyperText Transfer Protocol (HTTP)/1.1 request message when requesting the GMT.

11. The method according to claim 10, wherein the GMT is provided in an eXtensible Markup Language (XML) format.

12. A system for providing Greenwich Mean Time (GMT) in a mobile broadcasting service providing broadcasting services through a communication network and a broadcast network, the system comprising:
   a broadcast-providing server, which transmits a GMT access address included in an Electronic Service Guide (ESG) bootstrap File deLivery over Unidirectional Transport (FLUTE) session; and
   a mobile terminal, which receives and stores the GMT access address through the ESG bootstrap FLUTE session, requests the GMT from the communication network using the GMT access address when requiring the GMT, receives the GMT from the communication network, and stores and sets the GMT.

13. The system according to claim 12, wherein the GMT access address is included in an ESG access descriptor of the ESG bootstrap FLUTE session.

14. The system according to claim 13, wherein the GMT access address is included in time interactive descriptor syntax of the ESG access descriptor formed according to the following Table:

| Syntax | No. of bits | Mnemonic | Notes |
|---|---|---|---|
| Time Interactive Descriptor{ | | | |
| descriptor_tag | 8 | uimsbf | |
| descriptor_length | 8+ | vluimsbf8 | |
| required | 1 | bslbf | '0' = optional '1' = Mandatory |
| reserved | 7 | bslbf | |
| for(i=0; i<URILength; i++) | | | |
| { | | | |
| URIByte | 8 | bslbf | |
| } | | | |
| } | | | |

15. The system according to claim 13, wherein the mobile terminal requests the GMT through use of an ESG query.

16. The system according to claim 15, wherein the mobile terminal requests the GMT through use of an HTTP/1.1 request message.

17. The system according to claim 14, wherein the GMT is provided in an eXtensible Markup Language (XML) format.

18. The system according to claim 16, wherein the GMT is provided in an eXtensible Markup Language (XML) format.

19. A system for providing Greenwich Mean Time (GMT) in a mobile broadcasting service, the system comprising:
a communication network; and
a mobile terminal, which transmits an Electronic Service Guide (ESG) query to a pre-stored GMT access address when requiring the GMT, thereby requesting the GMT to the communication network, receives the GMT from the communication network, and stores and sets the GMT.

20. The system according to claim 19, wherein the GMT access address is a static address.

21. The system according to claim 20, wherein the mobile terminal requests the GMT using a HyperText Transfer Protocol (HTTP)/1.1 request message when requesting the GMT.

22. The system according to claim 21, wherein the GMT is provided in an eXtensible Markup Language (XML) format.

* * * * *